(No Model.)
H. J. THAYER.
FISHING APPARATUS.
No. 518,013. Patented Apr. 10, 1894.
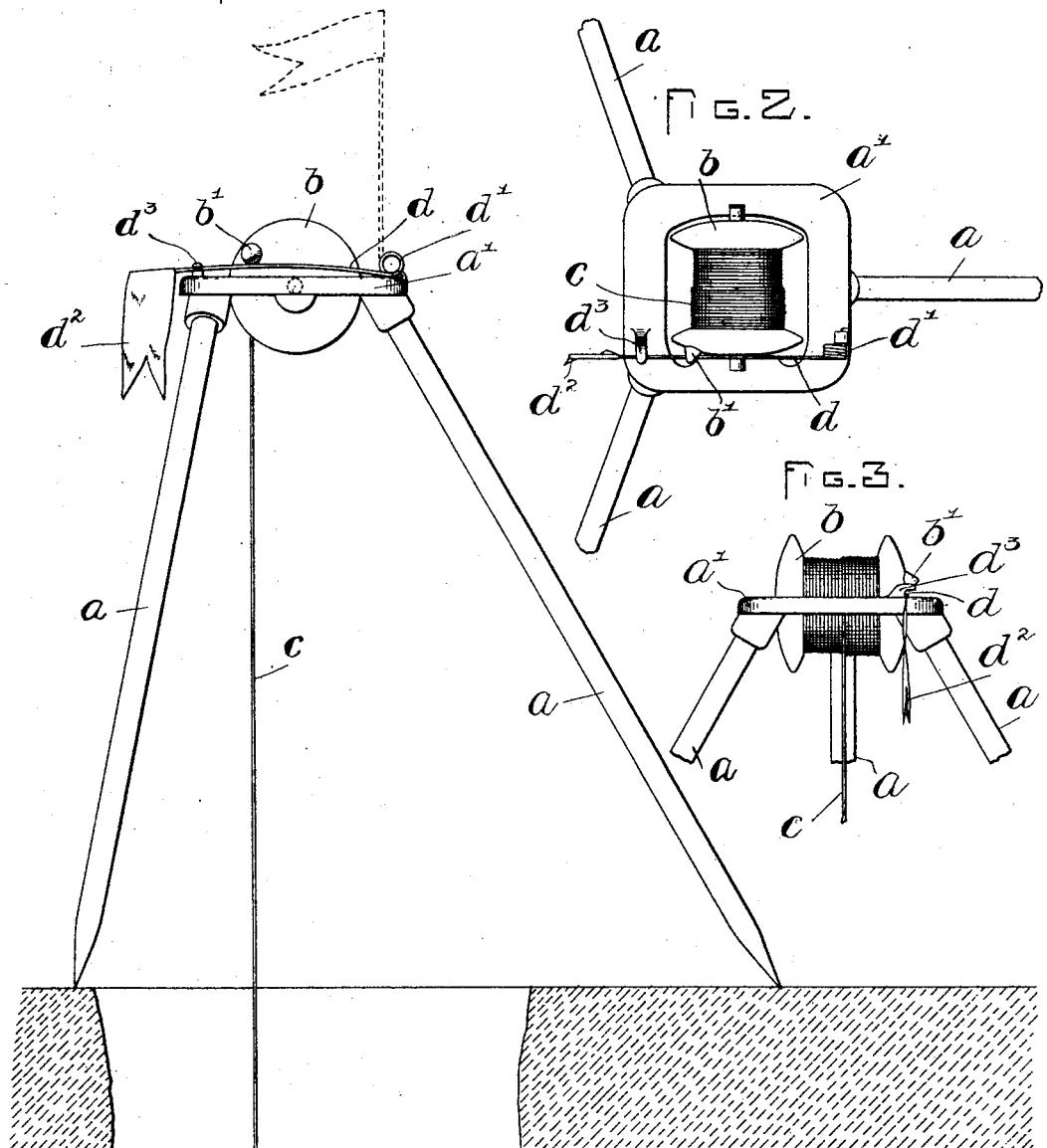
Witnesses
Walter F. McD...
Parker Davis
Inventor.
H. J. Thayer
by Wright Brown Crosley
Attys.

UNITED STATES PATENT OFFICE.

HENRY J. THAYER, OF BOSTON, MASSACHUSETTS.

FISHING APPARATUS.

SPECIFICATION forming part of Letters Patent No. 518,013, dated April 10, 1894.

Application filed October 9, 1893. Serial No. 487,597. (No model.)

*To all whom it may concern:*

Be it known that I, HENRY J. THAYER, of Boston, in the county of Suffolk and State of Massachusetts, have invented certain new and useful Improvements in Apparatus for Fishing through Ice, of which the following is a specification.

The object of this invention is to provide a more simple and efficient apparatus for fishing through ice, than has been produced, and to this end the invention consists in certain novel features of construction of parts hereinafter described and claimed.

The accompanying drawings illustrate a construction for carrying out the invention.

Figure 1, shows a side elevation of the apparatus. Fig. 2, shows a top plan view. Fig. 3, shows a side elevation as viewed from the left of Figs. 1 and 2.

The same letters of reference indicate the same parts in all the figures.

In carrying out my invention, I provide a suitable support which in the present instance is in the form of a tripod, consisting of legs $a$ and platform $a'$. Any other suitable form of support may however, be used and the invention is not limited in this respect. The platform $a'$ is in the form of a rectangular frame and has bearings for the trunnions of a wheel $b$, which occupies the opening of the frame and carries a line $c$, attached to it and adapted to wind upon it. The reel, $b$, has upon one of its end faces a pointed or conical lug $b'$, whose inclined or tapered sides perform a function hereinafter explained.

The letter $d$, designates a signal wire or rod having a spring coil $d'$ formed at one end and fastened to a lug on the platform $a'$, and tending to throw the wire rod to the vertical position indicated in broken lines in Fig. 1. Said rod carries a flag $d^2$, at its outer or free end to serve as a signal. This wire rod is capable of lateral movement and the apparatus is set by introducing said rod under a catch $d^3$ on the platform $a$. To accomplish this the rod must be depressed and moved laterally, and in such movement of the rod it is carried across the end of the reel and into the path of the lug $b'$.

The manner of using the apparatus is as follows: A hole is made in the ice as represented in the drawings and the tripod is set firmly upon the ice, the lower end of the legs being pointed, and the line $c$, is dropped through the hole, said line having been properly baited, and the apparatus is set as described by engaging the signal rod under the catch $d^3$. Slight pressure of the lug $b'$, against the signal rod, such as might be produced by a minnow attached as bait on the line $c$, does not cause the said lug to displace the rod, but the pull of a large fish is sufficient to cause the lug to move the rod outward and disengage it from the catch, $d^3$, whereupon the rod springs to a vertical position and the flag on its end signifies that a fish is caught. The attendant thus notified pulls in the fish and resets the apparatus.

Having thus described my invention, what I claim as new, and desire to secure by Letters Patent, is—

A fishing apparatus comprising in its construction a reel and support therefor, said reel carrying an inclined lug on one head, a spring actuated signal wire adapted to lie in the path of the inclined lug when the apparatus is set, and a catch on the reel support to hold said wire until displaced laterally by the said lug.

In testimony whereof I have signed my name to this specification, in the presence of two subscribing witnesses, this 4th day of October, A. D. 1893.

HENRY J. THAYER.

Witnesses:
EUGENE GUELPA,
HERBERT G. WHITE.